(12) United States Patent
Stanley

(10) Patent No.: US 9,194,130 B1
(45) Date of Patent: Nov. 24, 2015

(54) ELONGATED RAIL SYSTEM FOR MOUNTING OBJECTS TO ROOF STRUCTURES

(71) Applicant: Joel A. Stanley, Dallas, TX (US)

(72) Inventor: Joel A. Stanley, Dallas, TX (US)

(73) Assignee: BWDT, LLC, Colleyville, TX (US)

( * ) Notice: Subject to any disclaimer, the term of this patent is extended or adjusted under 35 U.S.C. 154(b) by 0 days.

(21) Appl. No.: 14/482,941

(22) Filed: Sep. 10, 2014

Related U.S. Application Data

(60) Provisional application No. 61/875,868, filed on Sep. 10, 2013.

(51) Int. Cl.
*E04D 13/16* (2006.01)
*E04B 1/58* (2006.01)
*E04B 1/66* (2006.01)

(52) U.S. Cl.
CPC . *E04D 13/16* (2013.01); *E04B 1/58* (2013.01); *E04B 1/66* (2013.01)

(58) Field of Classification Search
CPC ........ Y02E 10/47; Y02B 10/20; Y02B 10/12; F24J 2/5245; E04D 13/16
USPC .......... 52/58, 710, 173.3, 746.11, 746.1, 52/408–413, 24; 156/71; 136/251
See application file for complete search history.

(56) References Cited

U.S. PATENT DOCUMENTS

| | | | | |
|---|---|---|---|---|
| 5,603,187 | A * | 2/1997 | Merrin et al. | 52/58 |
| 5,609,326 | A * | 3/1997 | Stearns et al. | 256/12.5 |
| 6,360,491 | B1 * | 3/2002 | Ullman | 52/22 |
| 6,526,701 | B2 * | 3/2003 | Stearns et al. | 52/24 |
| 8,448,405 | B2 * | 5/2013 | Schaefer et al. | 52/710 |
| 8,752,338 | B2 * | 6/2014 | Schaefer et al. | 52/60 |
| 8,857,108 | B2 * | 10/2014 | Smeja | 52/26 |
| 2007/0266672 | A1 * | 11/2007 | Bateman et al. | 52/747.1 |
| 2011/0023390 | A1 * | 2/2011 | Kneip et al. | 52/173.3 |

* cited by examiner

*Primary Examiner* — Jeanette E Chapman
*Assistant Examiner* — Daniel Kenny
(74) *Attorney, Agent, or Firm* — James E. Walton

(57) ABSTRACT

A system and method to attach an object to a support structure, the system includes an elongated rail, an elastic membrane bonded to the elongated rail, a riser removably attached to the elongated rail, and a plurality of fastener configured to secure the elongated rail to the roof structure.

1 Claim, 5 Drawing Sheets

ELONGATED RAIL SYSTEM FOR MOUNTING OBJECTS TO ROOF STRUCTURES

BACKGROUND

1. Field of the Present Description

The present description relates to methods and system for mounting objects to roof structures.

2. Description of Related Art

Various applications exist in which a polymeric membrane may be placed over a surface. For example, it may be desirable to provide a polymeric membrane as a roofing material. That is, a polymeric membrane may be applied to an outer surface of a building structure, such as a roof, to protect the structure from the environment. The polymeric membrane may also be utilized with a mounting plate. In this embodiment, the mounting plate is rigidly attached to the roof structure and the polymeric membrane is allied thereon to prevent water from penetrating the roof structure.

Although great strides have been made in roofing membranes, considerable shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
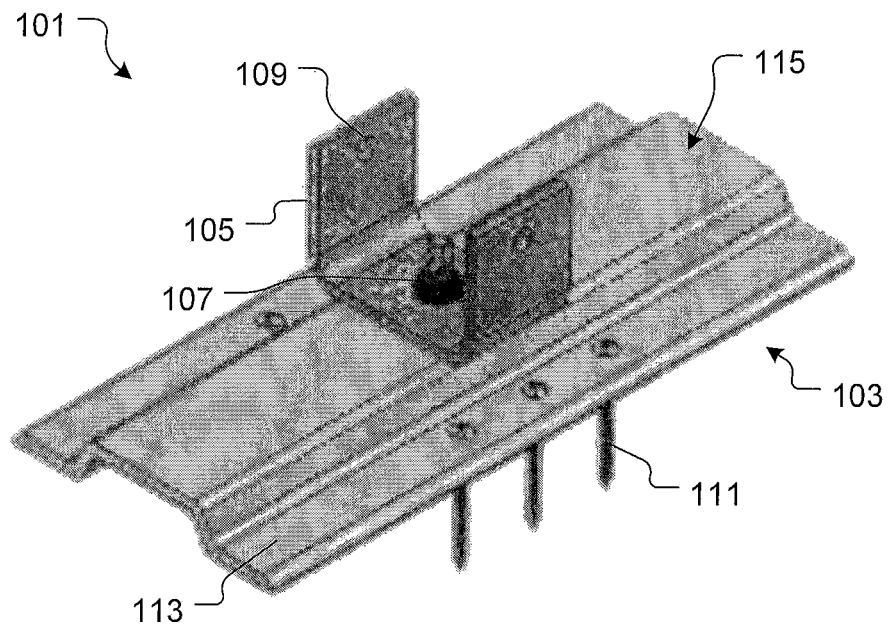
FIGS. 1 and 2 are oblique and front views of an elongated rail system according to one embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

The present disclosure describes methods and systems for mounting or otherwise attaching an object to roof structures. For example, in some instances, the present disclosure describes methods and systems for attaching objects to polymeric membranes utilized for covering all or a portion of a building structure roof. In some instances, the polymeric membranes may include thermoplastic polymeric membranes ("thermoplastic membranes"), while, in other instances, the polymeric membranes may include thermoset polymeric membranes ("thermoset membranes"). Example objects that may be attached include photovoltaic cells, an air handling component (e.g., air conditioning or heating components), telecommunications equipment (e.g., antennas, satellite dishes, etc.), or any other desired object. It should be understood that the materials described herein provide sufficient elasticity for the features described below.

Utilizing the described systems and methods for securing one or more photovoltaic cells to the roof of a structure may provide tax benefits. For example, tax benefits may exist for having photovoltaic cells attached to the structure of a roof that are otherwise unavailable for photovoltaic cells that are merely placed on a roof unattached to the roof structure. Thus, in some implementations, the system and methods described herein provide for attaching an object to the roof structure, and, in the case of photovoltaic cells, may enable a user to enjoy the available tax benefits associated therewith.

In other implementations, the described methods and systems may be utilized for attaching objects to a polymeric membrane forming part of a structure. Further, while some implementations may be described with respect to thermoplastic membranes, thermoset membranes may also be applicable and vice versa. In general, the described methods and systems may be applicable to applications including roofing, waterproofing, earth lining, pond lining, tent construction, tension fabric applications, air forming technologies, flexible plastic forming (such as with flexible plastic films), rigid plastic forms, as well as any other suitable application.

It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 2:
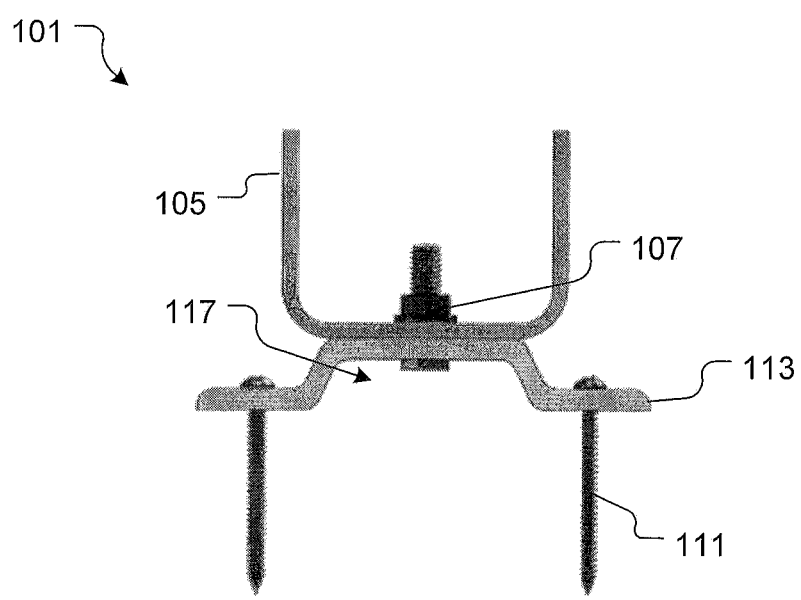

Referring now to the drawings wherein like reference characters identify corresponding or similar elements throughout the several views, FIGS. 1 and 2 depict respective oblique and front views of a rail system 101 according to one preferred embodiment of the present application.

Rail system 101 is configured to secure an object (not shown) to a support structure. For example, rail system 101 could be utilized in the field of roofing systems, wherein the object being supported thereto could include solar panels. However, it will be appreciated that the rail system 101 could be utilized to support other types of objects to various types of support structures in lieu of the preferred embodiment.

Rail system 101 includes one or more of an elongated mounting rail 103 configured to securely attach to a riser 105 via a fastener 107. In the preferred embodiment, fastener is welded directly to rail 103; however, the exemplary embodiment illustrates an optional feature of passing the fastener directly through the thickness of rail 103 and fastened with a bolt. Also, the illustrative embodiment shows riser 105 having a U-shaped bracket with a base and two sides extending therefrom. However, it will be appreciated that alternative embodiments could include different types of fasteners and brackets in lieu of the exemplary embodiment. Riser 105 includes one or more attachment devices 109 devices configured to securely fasten the objected to rail 103. In the exemplary embodiment, attachment device 109 is a hole that extends through the thickness of riser 105.

In the contemplated embodiment, rail 103 is configured to securely fasten to the roof structure via one or more screws 111 and/or other types of fasteners, which in this embodiment, includes six threaded screws passing through the thickness of a base portion 113 and equally spaced apart from each other, three on each side of riser 105.

In one assembly process includes securing riser 105 to rail 103 and then securing rail 103 to the roof structure via screws 111. Thereafter, it is contemplated utilizing an elastic membrane and/or other suitable means to cover rail 103, which in turn is secured to the roof structure. In the preferred embodiment, the membrane is securely bonded to a top surface 115 of rail 103. It will be appreciated that covering the rail with the elastic membrane prevents water penetration. Rail 103 also includes an elevated area that forms a cavity 117 that is sufficiently sized to receive a head of fastener 107.

The preferred process to utilize rail system 101 includes the steps of: Step 1: a flat sheet of prepared steel is formed, adding ridges to increase structural stiffness, either by way of a sheet metal brake or by way of a roll former. Step 2: Once the sheet metal is formed or shaped as desired holes can be punched to indicate fastener locations. Step 3: A PVC, TPO, EPDM or Asphalt compatible (PVC for PVC, TPO for TPO and so on as well as potentially being a brand specific) coating/adhesive material is applied to the top surface, down the middle, extending down the length of the prepared metal, either periodically or continuously from one end to the other. Step 4: A layer of PVC sheet vinyl film, TPO Film, EPDM Film, Asphalt membrane or other compatible film/membrane is laid over the prepared metal with a coating or adhesive applied. The film or membrane is cut to size and is placed over the prepared metal with the coating/adhesive is in contact with the film or membrane. Heat and or pressure is applied fusing the two material together. Step 5: A portion of the fused material is removed exposing a clean metal surface. Step 6: A bolt, nut or other securing hardware is applied to via adhesive or welding directly to the exposed metal. This allows for other structural framing systems to ne affixed to the prepared assembly.

The process is better described as: a layer of sheet metal is prepared adding engineered ridges for stiffness; an adhesive/coating is applied down the center of the metal strip; a membrane is prepared to cover the previously prepared metal strip; the membrane and metal are them fused together; a grinder is used to create hole in the membrane and expose clean metal; and a bolt is welded to the surface of the metal strip.

Figure 3:
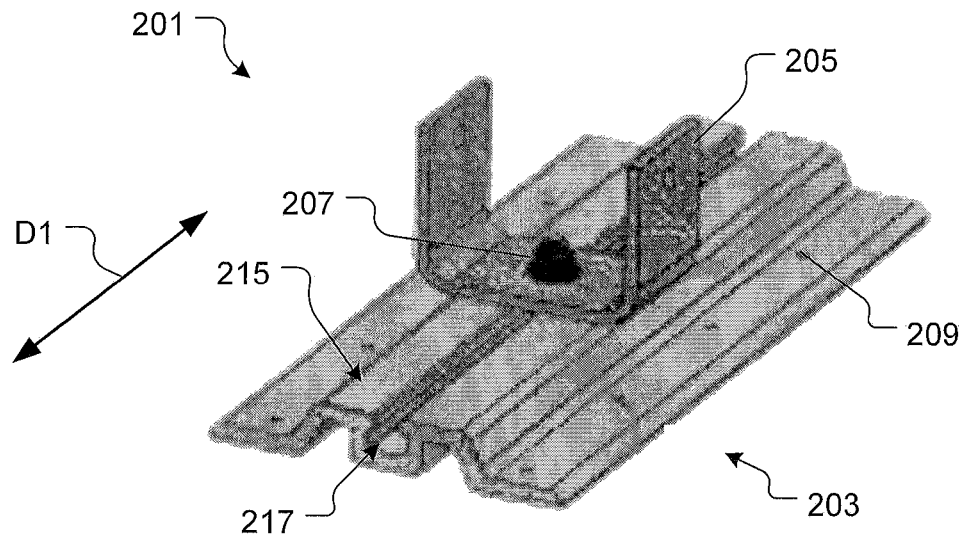
FIGS. 3-5 are various views of an alternative embodiment of the rail system of FIG. 1.
Figure 4:
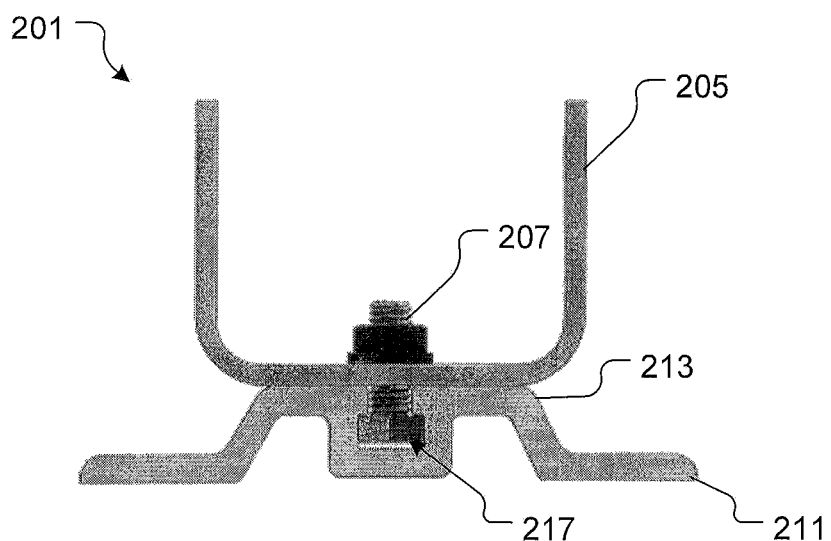
Figure 5:
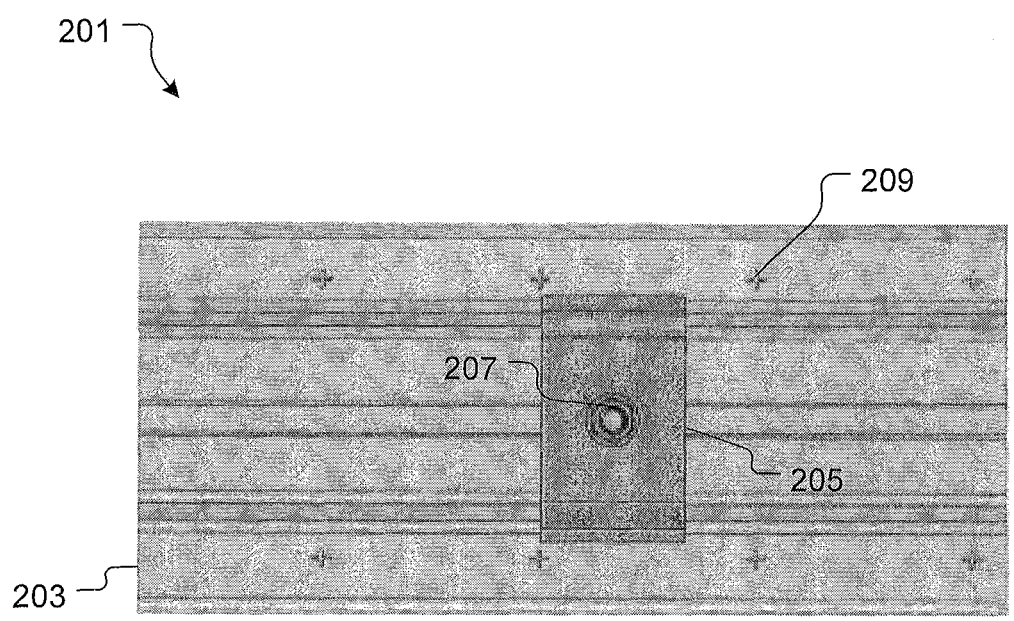

Referring now to FIGS. 3-5 in the drawings, respective oblique, front, and top views of an elongated rail system 201 are shown according to an alternative embodiment. Rail system 201 is substantially similar in form and function to rail system 101 and the features discussed herein are optionally incorporated with both systems.

Rail system 201 includes an elongated rail 203 that securely fastens to a riser 205 via a fastener 207. In this embodiment, rail 203 fastens to the roof structure via one or more screws and/or other suitable fasteners in one or more holes 209. In the contemplated embodiment, there are eight holes equally spaced from each other and on opposing sides of riser 207.

Rail 203 includes a base 211 and an elevated portion 213 extending therefrom that carries riser 207 on a surface 215.

The elevated portion 213 forms a channel 217 that allows movement along rail 203 in the direction indicated by arrow D1. The channel 217 forms a cavity that receives the head of fastener 217.

Figure 6:
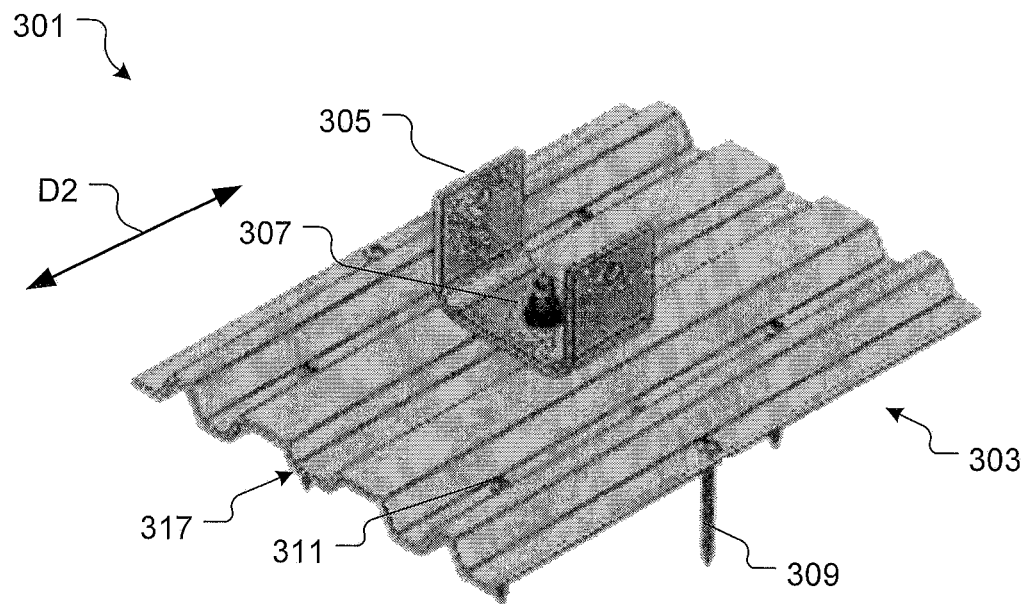
FIGS. 6-8 are various views of an alternative embodiment of the rail system of FIG. 1.
Figure 7:
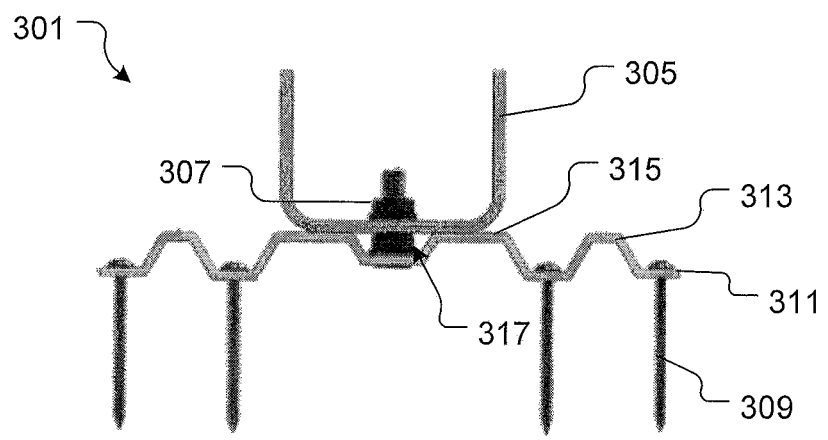
Figure 8:
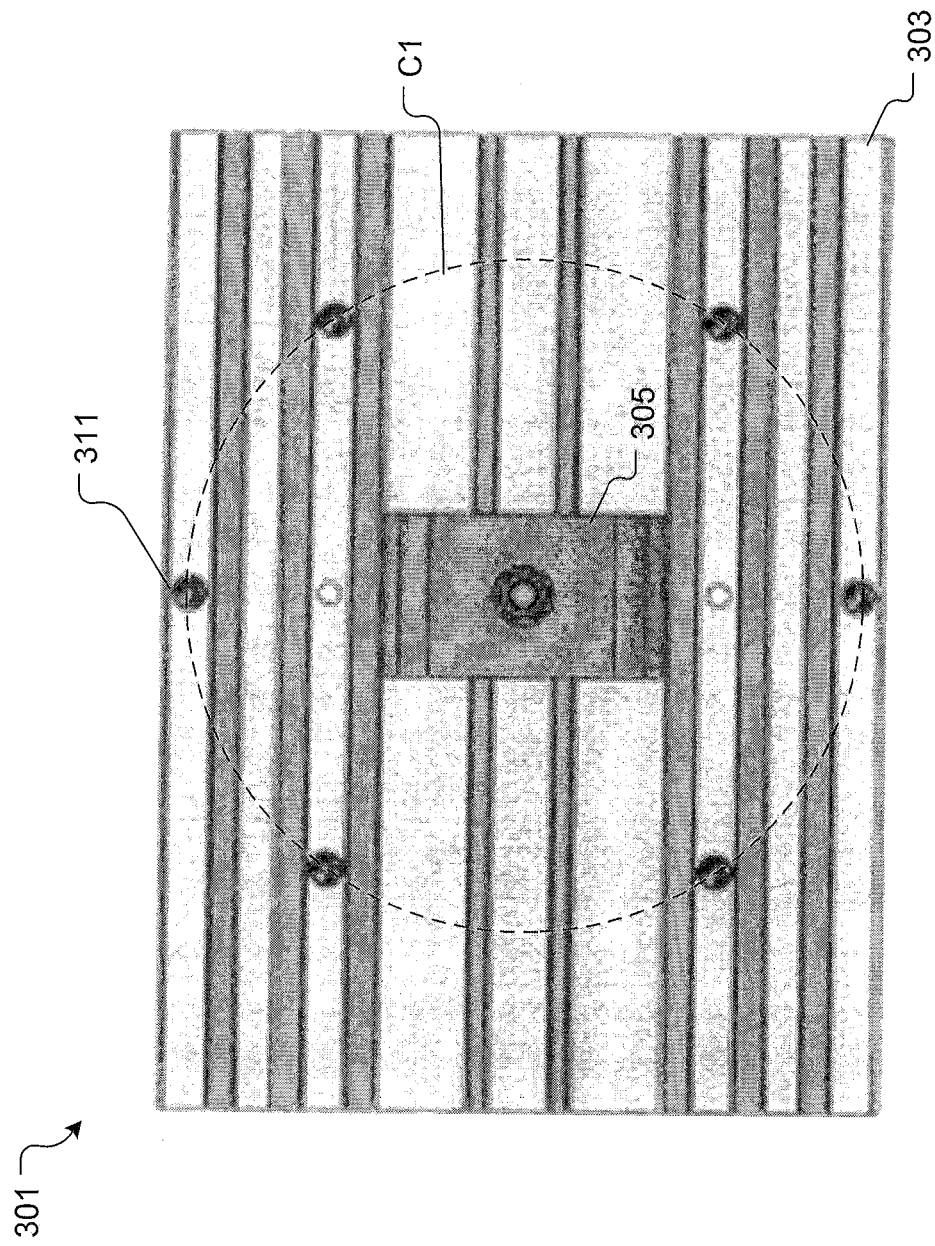

Referring next to FIGS. 6-8 in the drawings, respective oblique, front, and top views of an elongated rail system 301 are shown according to an alternative embodiment. Rail system 301 is substantially similar in form and function to the rail systems discussed above and the features discussed herein are optionally incorporated with all systems.

Rail system 301 includes an elongated rail 303 that securely fastens to a riser 305 via a fastener 307. In this embodiment, rail 303 fastens to the roof structure via one or more screws 309 and/or other suitable fasteners in one or more holes 311. In the contemplated embodiment, there are eight holes equally spaced from each other and in a circular pattern, indicated by circle C1, around riser 307.

Rail 303 includes a base 311 and elevated portions 313 and 315 extending therefrom. Elevated portion 315 carries riser 305 and forms a channel 317 that allows movement of riser 305 along rail 303 in the direction indicated by arrow D2. The channel 317 forms a cavity that receives the head of fastener 217.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An elongated rail system for attaching an object to a roof structure, comprising:
   an elongated rail having:
      a base with an elevated portion that forms a channel;
      an elastic membrane bonded to the base of the elongated rail;
      a riser removably attached to the elongated rail via a fastener having a head, the fastener head being configured to slidingly engage within the channel, the fastener being configured to secure the riser in a fixed position as the fastener head is tightened against a wall of the channel; and
   a plurality of fasteners configured to secure the elongated rail to the roof structure;
   wherein the elastic membrane prevents moisture from reaching the roof structure.

* * * * *